United States Patent
Jung

(10) Patent No.: US 7,969,234 B2
(45) Date of Patent: Jun. 28, 2011

(54) CLOCK CONTROL CIRCUIT AND VOLTAGE PUMPING DEVICE USING THE SAME

(75) Inventor: Jong Ho Jung, Seoul (KR)

(73) Assignee: Hynix Semiconductor Inc., Icheon-si (KR)

( * ) Notice: Subject to any disclaimer, the term of this patent is extended or adjusted under 35 U.S.C. 154(b) by 0 days.

(21) Appl. No.: 12/655,742

(22) Filed: Jan. 5, 2010

(65) Prior Publication Data

US 2010/0109628 A1    May 6, 2010

Related U.S. Application Data

(62) Division of application No. 11/788,737, filed on Apr. 20, 2007, now Pat. No. 7,772,914.

(30) Foreign Application Priority Data

Nov. 20, 2006    (KR) .................. 10-2006-0114744

(51) Int. Cl.
*G05F 3/02*    (2006.01)

(52) U.S. Cl. .......................... 327/536; 363/60

(58) Field of Classification Search ............ 327/536; 363/59, 60
See application file for complete search history.

(56) References Cited

U.S. PATENT DOCUMENTS

| | | | | |
|---|---|---|---|---|
| 4,970,409 A * | 11/1990 | Wada et al. | .............. | 327/541 |
| 5,883,501 A * | 3/1999 | Arakawa | .............. | 323/222 |
| 5,973,514 A | 10/1999 | Kuo et al. | | |
| 6,157,242 A * | 12/2000 | Fukui | .............. | 327/536 |
| 6,160,723 A * | 12/2000 | Liu | .............. | 363/60 |
| 6,259,612 B1 * | 7/2001 | Itoh | .............. | 363/60 |
| 6,288,963 B1 | 9/2001 | Kato | | |
| 6,356,137 B1 | 3/2002 | Roohparvar et al. | | |
| 6,456,153 B2 * | 9/2002 | Buck et al. | .............. | 327/536 |
| 6,480,057 B2 * | 11/2002 | Ogura | .............. | 327/536 |
| 6,486,729 B2 * | 11/2002 | Imamiya | .............. | 327/536 |
| 6,501,326 B2 | 12/2002 | Fujii et al. | | |
| 6,781,440 B2 * | 8/2004 | Huang | .............. | 327/537 |
| 6,781,908 B1 | 8/2004 | Pelley et al. | | |
| 6,853,567 B2 * | 2/2005 | Kwon | .............. | 363/60 |
| 6,930,535 B2 * | 8/2005 | Kim | .............. | 327/536 |
| 7,053,945 B1 | 5/2006 | Xue | | |
| 7,116,154 B2 * | 10/2006 | Guo | .............. | 327/536 |
| 7,268,612 B2 * | 9/2007 | Senda et al. | .............. | 327/536 |
| 7,304,530 B2 | 12/2007 | Wei et al. | | |

(Continued)

FOREIGN PATENT DOCUMENTS

KR    10-0143035    4/1998

(Continued)

OTHER PUBLICATIONS

Office Action issued Dec. 16, 2008 in connection with U.S. Appl. No. 11/788,737, filed Apr. 20, 2007.

(Continued)

*Primary Examiner* — Kenneth B. Wells
(74) *Attorney, Agent, or Firm* — John P. White; Cooper & Dunham LLP

(57) ABSTRACT

A clock control circuit is provided. The clock control circuit includes a voltage supplier for supplying a first voltage in response to a first clock signal, a voltage booster for boosting the first voltage in response to the first clock signal input to the voltage booster, and a clock generator for generating a second clock signal having a voltage level equal to the boosted first voltage in response to the first clock signal.

2 Claims, 3 Drawing Sheets

U.S. PATENT DOCUMENTS

| | | | | |
|---|---|---|---|---|
| 7,532,060 B2 * | 5/2009 | Albano et al. | ................. | 327/536 |
| 7,586,361 B2 * | 9/2009 | Fukuda | ......................... | 327/536 |
| 7,629,831 B1 * | 12/2009 | Perisetty et al. | ............... | 327/536 |

FOREIGN PATENT DOCUMENTS

| | | |
|---|---|---|
| KR | 10-2005-0101856 A | 10/2005 |
| KR | 10-2006-0044001 A | 5/2006 |
| KR | 10-2006-0075831 A | 7/2006 |
| KR | 10-2006-0106404 A | 10/2006 |

OTHER PUBLICATIONS

Office Action issued Feb. 17, 2009 in connection with U.S. Appl. No. 11/788,737, filed Apr. 20, 2007.

Final Office Action issued Jul. 27, 2009 in connection with U.S. Appl. No. 11/788,737, filed Apr. 20, 2007.

Notice of Allowance issued Oct. 7, 2009 in connection with U.S. Appl. No. 11/788,737, filed Apr. 20, 2007.

* cited by examiner

CLOCK CONTROL CIRCUIT AND VOLTAGE PUMPING DEVICE USING THE SAME

This application is a divisional of U.S. Ser. No. 11/788,737, filed Apr. 20, 2007 now U.S. Pat. No. 7,772,914, which claims priority of Korean Patent Application No. 10-2006-114744, filed Nov. 20, 2006, the contents of which are hereby incorporated by reference into this application.

BACKGROUND

The present disclosure relates to a clock control circuit and a voltage pumping device using the same, and more particularly to a clock control circuit and a voltage pumping device using the same which are capable of achieving an enhancement in pumping efficiency.

Generally, a DRAM is a random access memory capable of writing or reading data to/from memory cells each consisting of one transistor and one capacitor. Since such a DRAM uses an NMOS transistor for the transistor of each memory cell, it also includes a voltage pumping device for driving word lines, taking into consideration a voltage loss caused by a threshold voltage Vt, in order to generate a voltage higher than a sum of an external supply voltage Vdd and the threshold voltage Vt (Vdd+Vt).

That is, in order to turn on the NMOS transistor mainly used for each DRAM memory cell, it is necessary to apply, to the gate of the NMOS transistor, a voltage higher than a source voltage by the threshold voltage Vt. In detail, since the maximum voltage applicable to the DRAM is limited to the level of the external supply voltage Vdd, a voltage boosted to a level corresponding to "Vdd+Vt" or higher should be applied to the gate of the NMOS transistor, in order to enable a voltage of a full Vdd level to be read from a cell or a bit line or to be written on the cell or bit line.

Recently, much effort has been conducted in semiconductor device fields, in order to achieve various improvements for reduction of power consumption. In particular, various research has been conducted to reduce power consumption in a self-refresh mode of a DRAM semiconductor device. The current consumed for a self-refresh time to store data in a memory cell during a self-refresh operation is referred to as "self-refresh current". In order to reduce the self-refresh current, it is necessary to increase the self-refresh period. This may be achieved by increasing the time, for which the memory cell sustains data, namely, a data retention time. One method for increasing the data retention time is to increase the back-bias voltage applied to the transistor of each memory cell. In accordance with this method, the back-bias voltage VBB output from a voltage pumping device after being pumped is supplied to each cell transistor at an increased level in a self-refresh mode, as compared to those in other modes. Accordingly, the off leakage current of the cell transistor can be reduced, so that the data retention time can be increased.

As can be seen from the above description, a high voltage VPP is used to drive word lines of a DRAM, whereas the back-bias voltage VBB is applied to the transistor of each memory cell of the DRAM, in order to reduce self-refresh current. The high voltage VPP and back-bias voltage VBB are generated from a voltage pumping device which includes an oscillator and a voltage pump. The voltage pump of the voltage pumping device receives a clock generated from the oscillator, and pumps the high voltage VPP and back-bias voltage VBB, using a method for boosting a voltage at a floated node in accordance with a clock toggling effect and a capacitor coupling effect. In this case, a MOS transistor is used for a switch for floating the node.

In this case, however, a voltage loss corresponding to the threshold voltage is generated due to the characteristics of the MOS transistor, thereby causing a degradation in the efficiency of the voltage pump. Furthermore, the threshold voltage of the MOS transistor is gradually increased due to a body effect. For this reason, when the supply voltage is lowered, it is more difficult to overcome the voltage loss corresponding to the threshold voltage and to pump each of the high voltage VPP and back-bias voltage VBB to a desired level.

BRIEF SUMMARY

In one aspect of the present disclosure, a clock control circuit comprises a voltage supplier for supplying a first voltage in response to a first clock signal a voltage booster for boosting the first voltage in response to the first clock signal input to the voltage booster and a clock generator for generating a second clock signal having a voltage level equal to the boosted first voltage in response to the first clock signal.

The voltage supplier may comprise a PMOS transistor connected to a source for the first voltage and a first node.

The first voltage may be a supply voltage.

The booster may comprise a capacitor connected between an input terminal for the first clock signal and a first node.

The clock generator may comprise a pull-up device connected between a first node and a second node, and configured to pull up the second node in response to the clock signal, and a pull-down device connected between the second node and a ground terminal, and configured to pull down the second node in response to the clock signal.

In another aspect of the present disclosure, a voltage pumping device comprises a voltage detector configured to receive a first voltage and a reference voltage, and generate a voltage pumping enable signal an oscillator for generating a first clock signal in response to the voltage pumping enable signal, a clock controller configured to receive the first clock signal, and boost a voltage level of the first clock signal, thereby generating a second clock signal and a voltage pump for pumping the first voltage in accordance with the second clock signal.

The clock control circuit according to the present disclosure and the voltage pumping device using the clock control circuit can greatly boost the voltage level of a clock input to the voltage pump, for voltage pumping. Accordingly, it is possible to efficiently pump the high voltage and back-bias voltage while preventing a reduction in voltage pumping efficiency caused by a voltage loss corresponding to the threshold voltage of a MOS transistor used as a switch.

The clock control circuit according to the present disclosure performs an operation for increasing the swing width of the clock input to the clock control circuit. That is, the clock control circuit boosts the voltage level of the clock. In one aspect, the present disclosure provides a circuit for generating an output clock having the same phase as an input clock. In another aspect, the present disclosure provides a circuit for generating an output clock having a phase opposite to that of an input clock.

In the clock control circuit of the present disclosure, a clock having an increased voltage level is input to the voltage pump of the voltage pumping device, as a clock signal for pumping a high voltage or a back-bias voltage. Since the voltage pump of the present disclosure is operated in accordance with the clock having an increased voltage level, it is possible to efficiently pump the high voltage and back-bias voltage while preventing a reduction in voltage pumping efficiency caused by a voltage loss corresponding to the threshold voltage of a MOS transistor used as a switch.

BRIEF DESCRIPTION OF THE DRAWINGS

The above and other features of the subject matter of the present disclosure will be more clearly understood from the following detailed description taken in conjunction with the accompanying drawings, in which.

DETAILED DESCRIPTION OF THE DISCLOSURE

Preferred embodiments of the present disclosure will now be described in detail with reference to the accompanying drawings.

Figure 1:
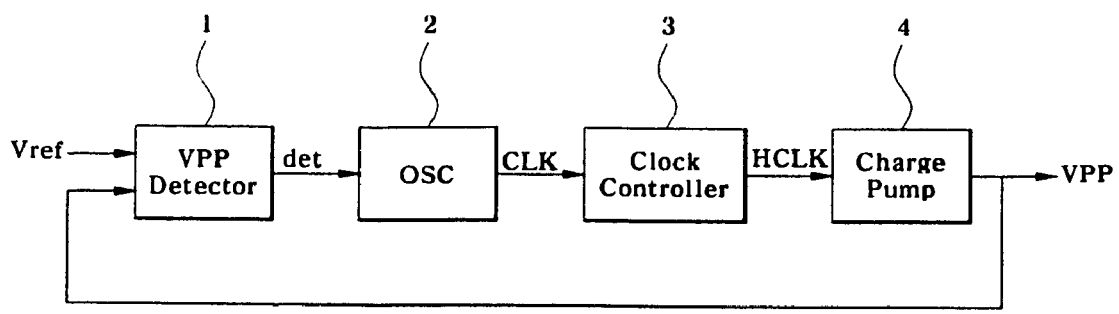
FIG. 1 is a block diagram illustrating a high-voltage pumping device according an exemplary embodiment of the present disclosure.

FIG. 1 is a block diagram illustrating a high-voltage pumping device according an exemplary embodiment of the present disclosure.

The voltage pumping device according to the illustrated embodiment of the present disclosure includes a voltage detector (VPP detector) 1 configured to receive a high voltage VPP feed back from a voltage pump 4 and a reference voltage Vref, an oscillator (OSC) 2 for generating a first clock signal CLK having a first swing width in response to a voltage pumping enable signal det, and a clock controller 3 configured to receive the first clock signal CLK, and boost the voltage level of the first clock signal CLK, to generate a second clock signal HCLK. The voltage pump 4, which is also included in the voltage pumping device, pumps the high voltage VPP in accordance with the second clock signal HCLK.

The voltage pump 4 pumps the high voltage VPP in accordance with a method for boosting a voltage at a floated node, using a clock toggling effect and a capacitor coupling effect. In this case, a MOS transistor (not shown), which generates a voltage loss corresponding to a threshold voltage thereof by virtue of the characteristics thereof, is used as a switch for floating the node. In accordance with the illustrated embodiment, the voltage pumping device generates the second clock signal HCLK, which has a voltage level higher than that of the first clock signal CLK, by the provision of the clock controller 3, and pumps the high voltage VPP, using the second clock signal HCLK. Thus, the high-voltage pumping device of the illustrated embodiment can recover the voltage loss corresponding to the threshold voltage of the MOS transistor, and can easily pump the high voltage VPP to a desired level.

Hereinafter, the configuration and operation of the clock controller 3 will be described in detail.

Figure 2:
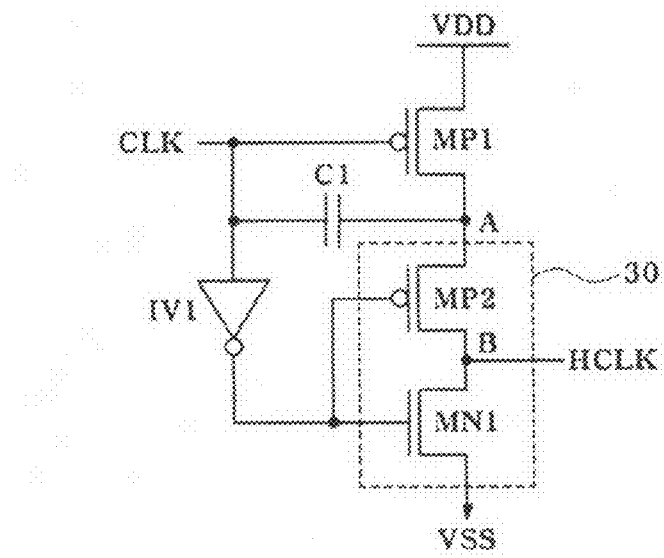
FIG. 2 is a circuit diagram illustrating a first embodiment of a clock controller included in the voltage pumping device of FIG. 1.
Figure 3:
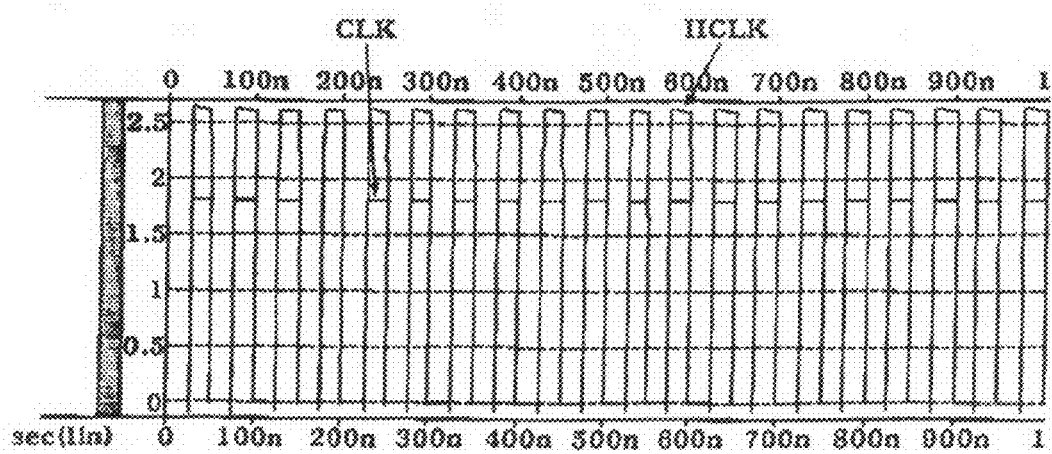
FIG. 3 is a waveform diagram illustrating input output clocks of the clock controller shown in FIG. 2.

FIG. 2 is a circuit diagram illustrating a first embodiment of the clock controller 3. FIG. 3 is a waveform diagram illustrating input and output clocks of the clock controller shown in FIG. 2.

As shown in FIG. 2, the clock controller 3 according to the first embodiment of the present disclosure includes a PMOS transistor MP1 connected between an input terminal for a supply voltage VDD (hereinafter, this terminal will be referred to as a "supply voltage terminal VDD"), and a node A, and configured to supply the supply voltage VDD to the node A in response to the first clock signal CLK. The first clock signal CLK has a swing width of VDD, namely, a swing width corresponding to a voltage range of 0 to VDD. The clock controller 3 also includes a capacitor C1 connected between an input terminal for the first clock signal CL and the node A, and configured to boost the voltage level of the node A to the level of the supply voltage VDD in response to the first clock signal CLK, and a clock generator 30 connected between the node A and an input terminal for a ground voltage VSS (hereinafter, this terminal will be referred to as a "ground terminal VSS"), and configured to buffer the first clock signal CLK or to transfer a signal from the node A, and thus, to generate the second clock signal HCLK. The second clock signal HCLK has a swing width of 2 VDD, namely, a swing width corresponding to a voltage range of 0 to 2VDD.

The clock generator 30 includes a PMOS transistor MP2 connected between the node A and a node B, and configured to pull up the node B to a level of 2VDD, in response to an output signal from an inverter IV1, and an NMOS transistor MN1 connected between the node B and the ground terminal VSS, and configured to pull down the node B to the level of the ground voltage VSS in response to the output signal from the inverter IV1.

Hereinafter, operation of the clock controller having the above-described configuration according to the first embodiment of the present disclosure will be described. In the following description, it is assumed that the first clock signal CLK has the same swing width as that of the supply voltage VDD. That is, the first clock signal CLK is swung between the level of VSS, namely, 0V, and the level of VDD.

First, when the first clock signal CLK has the ground voltage level, the PMOS transistor MP1 is turned on. In this state, the supply voltage VDD is supplied to the node A, thereby precharging the node A to the level of VDD. Also, the PMOS transistor MP2 is turned off, whereas the NMOS transistor MN1 is turned on. Accordingly, the node B is pulled down, thereby causing the second clock signal HCLK output from the node B to transit to the level of VSS.

When the first clock signal CLK subsequently transits from the VSS level to the VDD level, the PMOS transistor MP1 is turned off. When the first clock signal CLK has the VDD level, the node A has a level corresponding to 2VDD because the potential difference between the input terminal for the first clock signal CLK and the node A is maintained at a certain level by a coupling effect of the capacitor. C1. In this state, the PMOS transistor MP2 is turned on, and the NMOS transistor MN1 is turned of f by a ground-level signal output from the inverter IV1. As a result, the signal from the node A is transferred to the node B, so that the second clock signal HCLK output from the node B has the 2VDD level. Thus, the second clock signal HCLK generated from the clock controller according to the first embodiment of the present disclosure is a clock having a voltage range of 0 to 2VDD. Namely, the second clock signal HCLK is a signal which swings between the VSS (0V) level and the 2VDD level.

Referring to FIG. 3, it can be seen that the second clock signal HCLK generated in the clock controller according to the first embodiment of the present disclosure has a voltage level higher than that of the first clock signal CLK while having the same phase as the first clock signal CLK. Since the voltage level of the second clock signal HCLK is determined to be the sum of the supply voltage VDD and the voltage of the first clock signal ("VDD+CLK"), it is possible to control the voltage level of the second clock signal HCLK by controlling the voltage level of the first clock signal CLK or the level of the supply voltage VDD.

Figure 4:
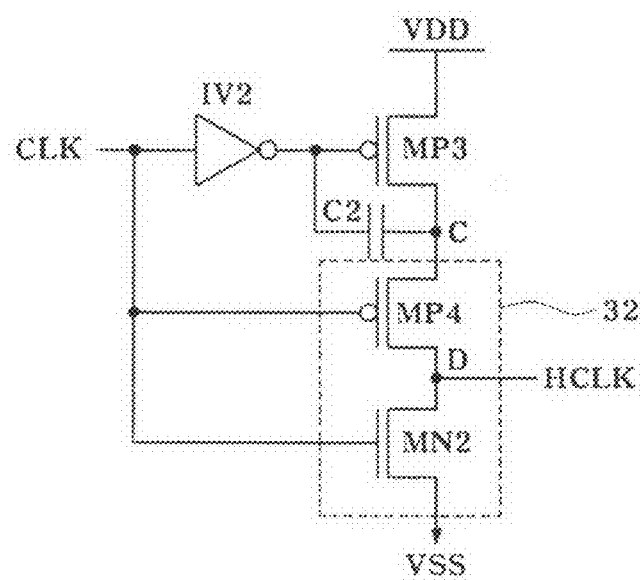
FIG. 4 is a circuit diagram illustrating a second embodiment of the clock controller included in the voltage pumping device of FIG. 1.
Figure 5:
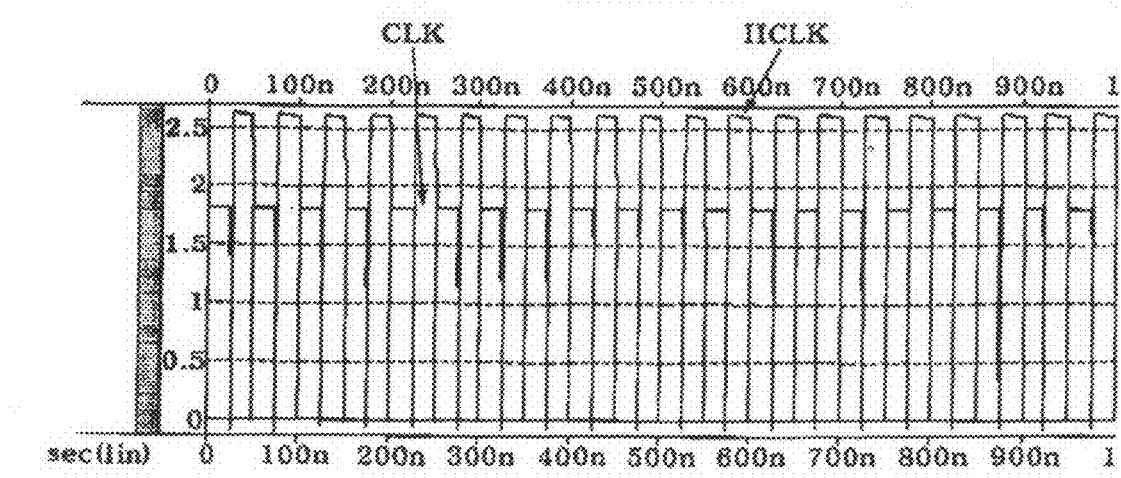
FIG. 5 is a waveform diagram illustrating input output clocks of the clock controller shown in FIG. 4.

FIG. 4 is a circuit diagram illustrating a second embodiment of the clock controller 3. FIG. 5 is a waveform diagram illustrating input and output clocks of the clock controller shown in FIG. 4.

As shown in FIG. 4, the clock controller 3 according to the second embodiment of the present disclosure includes an inverter IV2 connected to the supply voltage terminal VDD and a node C, and configured to buffer the first clock signal CLK which has a swing width of VDD, namely, a swing width corresponding to a voltage range of 0 to VDD. The clock controller 3 also includes a PMOS transistor MP3 configured to supply the supply voltage VDD to the node C in response to an output signal from the inverter IV2, and a capacitor C2 connected between an output terminal of the inverter IV2 and the node C, and configured to boost the voltage level of the node C to the level of the supply voltage VDD in response to the output signal from the inverter IV2. The clock controller 3 further includes a clock generator 32 connected between the node C and the ground terminal VSS, and configured to buffer the first clock signal CLK or to transfer a signal from the node C, and thus generate the second clock signal HCLK which has a swing width of 2VDD, namely, a swing width corresponding to a voltage range of 0 to 2VDD.

The clock generator 32 includes a PMOS transistor MP4 connected between the node C and a node D, and configured to pull up the node D to the level of 2VDD, in response to the first clock signal CLK, and an NMOS transistor MN2 connected between the node D and the ground terminal VSS, and configured to pull down the node D to the level of the ground voltage VSS in response to the first clock signal CLK.

Hereinafter, operation of the clock controller having the above-described configuration according to the second embodiment of the present disclosure will be described. In the following description, it is assumed that the first clock signal CLK has the same swing width as that of the supply voltage VDD. That is, the first clock signal CLK is swung between the level of VSS, namely, 0V, and the level of VDD.

First, when the first clock signal CLK has the level of VDD, the output signal from the inverter IV2 has the ground voltage level, thereby causing the PMOS transistor MP1 to turn on. In this state, the supply voltage VDD is supplied to the node C. Also, the PMOS transistor MP4 is turned off, whereas the NMOS transistor MN2 is turned on. Accordingly, the node D is pulled down, thereby causing the second clock signal HCLK output from the node D to transit to the level of the ground voltage VSS.

When the first clock signal CLK subsequently transits from the VSS level to the VDD level, the output signal from the inverter IV2 transits to the VDD level, thereby causing the PMOS transistor MP1 to turn off. When the output terminal of the inverter IV2 has the VDD level, as described above, the node C has a level of 2VDD because the potential difference between the output terminal of the inverter IV2 and the node C is maintained at a certain level by a coupling effect of the capacitor C2. In this state, the PMOS transistor MP4 is turned on, and the NMOS transistor MN2 is turned off by the first clock signal CLK which has the VSS level. As a result, the signal from the node C is transferred to the node D, so that the second clock signal HCLK output from the node D has the 2VDD level. Thus, the second clock signal HCLK generated from the clock controller according to the second embodiment of the present disclosure is a clock having a voltage range of 0 to 2VDD. Namely, the second clock signal HCLK is a signal swung between the VSS (0V) level and the 2VDD level.

Referring to FIG. 5, it can be seen that the second clock signal HCLK generated in the clock controller according to the second embodiment of the present disclosure has a voltage level higher than that of the first clock signal CLK while having the same phase as the first clock signal CLK. Since the voltage level of the second clock signal HCLK is determined to be the sum of the level of the ground voltage VSS and the swing width of the first clock signal ("VSS+CLK"), it is possible to control the swing width of the second clock signal HCLK by controlling the swing width of the first clock signal CLK.

While the present disclosure has been described in conjunction with preferred embodiments associated with devices for pumping a high voltage VPP, the subject matter of this disclosure can also be usefully applied to devices for pumping a back-bias voltage VBB, voltage generators using a memory charge pumping system, and devices requiring a clock having a voltage level higher than a supply voltage.

In addition, while preferred embodiments of the disclosure have been described for illustrative purposes, those skilled in the art will appreciate that various modifications, additions and substitutions are possible, without departing from the scope and spirit of the disclosure and in the accompanying claims. For example, elements and/or features of different examples and illustrative embodiments may be combined with each other and/or substituted for each other within the scope of this disclosure and appended claims.

The present application claims priority to Korean patent application number 10-2006-114744, filed on Nov. 20, 2006, which is incorporated by reference in its entirety.

What is claimed is:

1. A voltage pumping device comprising:
a clock controller configured to receive a first clock signal that is generated when a voltage level of a first voltage is lower than that of a reference voltage, and to boost a voltage level of the first clock signal, thereby generating a second clock signal; and
a voltage pump for pumping the first voltage in accordance with the second clock signal,
wherein the clock controller comprises a first MOS transistor connected between a supply voltage and a first node and configured to receive the first clock signal and to be turned on for supplying the supply voltage to the first node, a capacitor between an input node of the first clock signal and the first node, an inverter for inverting the first clock signal, a second MOS transistor connected between the first node and a second node that is an output node of the second clock signal, the second MOS transistor being configured to receive an output signal of the inverter and to be turned on for supplying a voltage of the first node to the second node, and a third MOS transistor connected between the second node and a ground voltage and configured to receive an output signal of the inverter and be turned on for supplying a ground voltage to the second node.

2. The voltage pumping device according to claim 1, wherein the first MOS transistor is a PMOS transistor, the second MOS transistor is a PMOS transistor and the third MOS transistor is an NMOS transistor.

* * * * *